US006449597B1

(12) United States Patent
McGill

(10) Patent No.: US 6,449,597 B1
(45) Date of Patent: Sep. 10, 2002

(54) SYSTEM FOR ASSEMBLY AND DISTRIBUTION OF AUTOMOBILES UTILIZING A PLURALITY OF PARTNER INTEGRATORS AND A PLURALITY OF MANUFACTURED AND SERVICE MODULES

(76) Inventor: Andrew R. McGill, 780 Heather Way, Ann Arbor, MI (US) 48104

( * ) Notice: Subject to any disclaimer, the term of this patent is extended or adjusted under 35 U.S.C. 154(b) by 0 days.

(21) Appl. No.: 09/206,662

(22) Filed: Dec. 7, 1998

(51) Int. Cl.[7] .............................................. G06F 17/60
(52) U.S. Cl. ............................................. 705/1; 705/35
(58) Field of Search ........................... 705/1, 8, 22, 26, 705/27, 28, 29, 37, 80, 35, 36, 4, 38

(56) References Cited

U.S. PATENT DOCUMENTS

| | | | | |
|---|---|---|---|---|
| 5,644,726 A | * | 7/1997 | Oppenheimer | 705/38 |
| 5,704,045 A | * | 12/1997 | King et al. | 705/35 |
| 5,970,464 A | * | 10/1999 | Vnayak et al. | 705/4 |
| 5,970,476 A | * | 10/1999 | Fahey | 705/28 |
| 5,983,204 A | * | 11/1999 | Debe | 705/36 |

FOREIGN PATENT DOCUMENTS

DE          4413072      *   4/1994

OTHER PUBLICATIONS

A Macroeconomic Model For Interest–Free Economies: An Integrative Study Of Western And Islamic Economic Systems (Banking). Dissertation, By Anwar, Muhammad, University Of New Hampshire, 1985.*
Committed to co–operation. By Anon. Machinery and Production Engineering v 148 n 3777, Feb. 16, 1997.*
Financing of Private Small Scale Hydroelectric Projects. By Smukler, L. M., Franklin Pierce Law Center, Concord, NH. Energy Law Inst. Corp., Mar. 1981, 107p.*

(List continued on next page.)

Primary Examiner—Sam Rimell
(74) Attorney, Agent, or Firm—Harness, Dickey & Pierce, P.L.C.

(57) ABSTRACT

A system enabling an automotive consortium to assemble and/or distribute automobile vehicles utilizing a plurality of partner integrators and a plurality of manufactured modules and/or distribution services, wherein each of the integrators is assigned an ownership percentage in each of the distributed automotive vehicles, with each of said integrators contributing to said automotive consortium at least one specific assembled module such as an automotive vehicle chassis, an automotive vehicle body, an automotive vehicle interior, and/or an automotive vehicle engine, so that the automotive consortium can combine the modules to assemble a complete and finished vehicle, and/or contribute to said automotive consortium at least one specific distribution module such as vehicle delivery to the end-user customer, finance-insurance services, maintenance, etc. Collections are taken from end-user customers and allocated among automotive consortium members for associated usage fees, maintaining said vehicles and/or insuring said vehicles. The vehicles are at least partially owned in perpetuity by the integrators in proportion to the ownership percentages with associated usage fee revenue rights, and at the termination of each vehicle's lifetime, providing for the return of all manufactured modules to their respective owner integrators for reuse or recycling, providing an authorized end-user customer of the automotive vehicle exclusive access to the automotive vehicle for a time period determined by the end-user customer, with the ability to exchange the automotive vehicle for a different automotive vehicle at authorized locations from time to time.

7 Claims, 4 Drawing Sheets

OTHER PUBLICATIONS

Plastics Will Run On Fast Track In Tomorrow's Detroit. Auth. Miller, Bernie, Plstics World, Newton, MA, v 45 n 10, Sep. 1987, pp. 20–27.*

Controlling information premia by repackaging asset-backed securities. By David, Alexander. Journal of Risk and Insurance, Dec. 1997, pp. 619.*

Alliance formed to provide 401(k) services. Benefits and Compensation International, Nov. 1992, pp. 39.*

Auto Dealers Take Web Offensive: Extranets, changes combat 'disint . . . . Auth. Wilson, Tim. Internetweek, v799, pp. 1(2), Feb. 7, 2000.*

Plug and play software hones car and plane manufacture. Doherty, C., Uslander, T., IEEE Spectrum, vol.: 35, Issue: 10, pp.: 39–42. Oct. 1998.*

* cited by examiner

SYSTEM FOR ASSEMBLY AND DISTRIBUTION OF AUTOMOBILES UTILIZING A PLURALITY OF PARTNER INTEGRATORS AND A PLURALITY OF MANUFACTURED AND SERVICE MODULES

BACKGROUND OF THE INVENTION

It is known to manufacture automobiles by combining modules that are manufactured by the automobile manufacturer or by other suppliers of modules. Assembly is faster because less of the vehicle is assembled in the automaker's plant. Suppliers will make the modules at their own plants and deliver them to the exact location and at the exact time scheduled for integration by the automaker. The result is the manufacture of an automobile with a dramatic reduction in parts, time and cost.

Instead of needing a big inventory of parts, automakers can build every car to order. The cost of designing, engineering and manufacturing the car is shifted to the suppliers. Obtaining modules from suppliers frees up space in automaker assembly plants and also frees up money that enables sales prices to be reduced so that. better profit margins are attained by the automobile manufacturer.

SUMMARY OF THE INVENTION

This invention introduces an innovative futuristic process for the manufacture, assembly, acquisition, usage and recovery of automotive vehicles in a manner that maximizes the ease and professionalism of customer selection and acquisition, choice and exchange, usage and return, and vehicle recovery, while also maximizing the economic value to both the customer and the contributors to the vehicle's manufacturing and assembly and ensuring enhanced customer loyalty while creating numerous strategic equity partnerships among key providers of manufacturing components and other services.

This invention provides a system wherein the automobile manufacturer involves module suppliers as partners in the manufacture, distribution and/or service of the modular automobile, and ownership of the automobile in perpetuity. Worn out modules will be returned to the module manufacturers, hereinafter referred to as integrators, for re-building or replacement.

Rather than being paid for their respective component contributions, integrators would own in perpetuity the proportional equity cash flow percentage relative to their percentage contribution of the vehicle's total value. A sample distribution is shown below:

| | |
|---|---|
| Auto Retailer | 35 percent |
| Chassis integrator | 5 percent |
| Body integrator | 5 percent |
| Interior integrator | 15 percent |
| Engine integrator | 20 percent |
| Finance integrator | 20 percent |
| Total | 100 percent |

What is a Module?

In its simplest form, a module is an assembly made up of different car parts. When the module is bolted onto a car, it allows many different parts to be installed at the same time. It may be an interior module including seats, door panels, instrument panel, overhead system, etc. It might be a front-end module that contains the radiator, cooling fan, headlights and bumper. Or it could be a rolling chassis that includes everything needed to make an entire vehicle but the body and interior. Modules can also provide services such as retailing, finance, insurance, etc., rather than manufactured elements.

Typically, a manufactured module is made up of parts that require different engineering disciplines to interact with one another.

Different automakers and suppliers have different ideas of how many modules will be needed to make an automobile.

Cars and trucks can be assembled quicker. The goal is to get the vehicle in the hands of the buyer in less than a week. Today, it takes about 40 days.

At the termination of each vehicle's lifetime, integrated vehicle modules are returned to the integrators for reuse and recycling of materials and components, which they would actually own.

System Benefits

In the present invention, the following benefits are achieved:

Customer retention.

Shortening of value chain.

Reduce capital employed in manufacturing.

Maximize customer choice.

Genuine shared equity with partners throughout value chain.

Environmentally cutting-edge friendly.

Allows vehicle portability and optimization for customers (e.g., they could use it anywhere in North America because all airports would have such cars at rental car locations, or on an as-needed basis, as for residents of Manhattan, Downtown Chicago or San Francisco, or for families that need a second or third car only occasionally).

All inclusive transportation package incorporates insurance, maintenance, rental replacement during travel with yearend income tax-business expense print-out of each trip, day and time, from start to end points based on GPS system and vehicle transponder.

Cell telephones and GPS map locators would be included in all vehicles, with calls paid for on your AutoCard 2000 account. Locators in addition to normal GPS mapping functions would direct you to the nearest AutoCard 2000 lot-any time you wanted to change cars. The cell phone would allow you to call ahead to the specific lot location to make a reservation, within the option limits of your Platinum-Gold-Regular Auto-Card 2000 package.

| ECONOMICS* | | AutoCard 2000 | |
|---|---|---|---|
| Vehicle lease | $350 | Daily average | $20 * |
| Maintenance | 75 | Mileage | 10 cents * |
| Insurance | 125 | * varies by model | |
| Flexibility | 150 | Annual use revenue | $7,300 |
| Monthly fee | $700 | Annual mileage | 1,200 |
| Annual cost | $8400 | Annual revenue | $8,500 * |

*actual charges based on comparable fair market utilization assumption = 80%

| Partner | Percentage | S$/Year | x3 * |
|---|---|---|---|
| Auto retailer | 35% | $2,975 | $8,925 |
| Chassis | 5 | 425 | 1,275 |
| Body | 5 | 425 | 1,275 |
| Interior | 15 | 1,275 | 3,750 |
| Engine | 20 | 1,700 | 5,100 |
| Finance | 20 | 1700 | 5,100 |
| Total | 100% | $8,500 | $25,500 |

* assumes three-year life of vehicle, after which it would be assigned to a similar program for used vehicles (aimed at student, lower end, and entry-level markets). When revenue from vehicle usage < its salvage value, it would be destroyed and components returned to their modular integrators for reuse and recycling.

|  | Residual $ Value | $ New | $ Used * | $ Total |
|---|---|---|---|---|
| Auto retailer | $0 | $8,925 | $4,462 | $13,387 |
| Chassis | 255 | 1,275 | 638 | 2,168 |
| Body | 320 | 1,275 | 638 | 2,233 |
| Interior | 750 | 3,750 | 1,912 | 6,412 |
| Engine | 500 | 5,100 | 2,550 | 8,150 |
| Finance | 0 | 5,100 | 2,550 | 7,650 |
| Totals | $1,825 | $25,500 | $12,750 | $40,000 |

(* assumes current residual cashflows and auto retailer would provide maintenance with parts/components supplied by modular partners and labor supplied by auto retailer.)

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

With reference to the drawing, the first step in the process of this invention is the selection by the automobile retailer of the long-term integrator partners as shown at 10 in FIG. 1. The various partners are shown at 12, 14, 16 and 18. As shown in FIG. 1, the four integrators 12, 14, 16 and 18 are shown as being selected by the auto retailer both from an appointment standpoint and for a joint design development with the retailer as indicated at 20.

Figure 1:
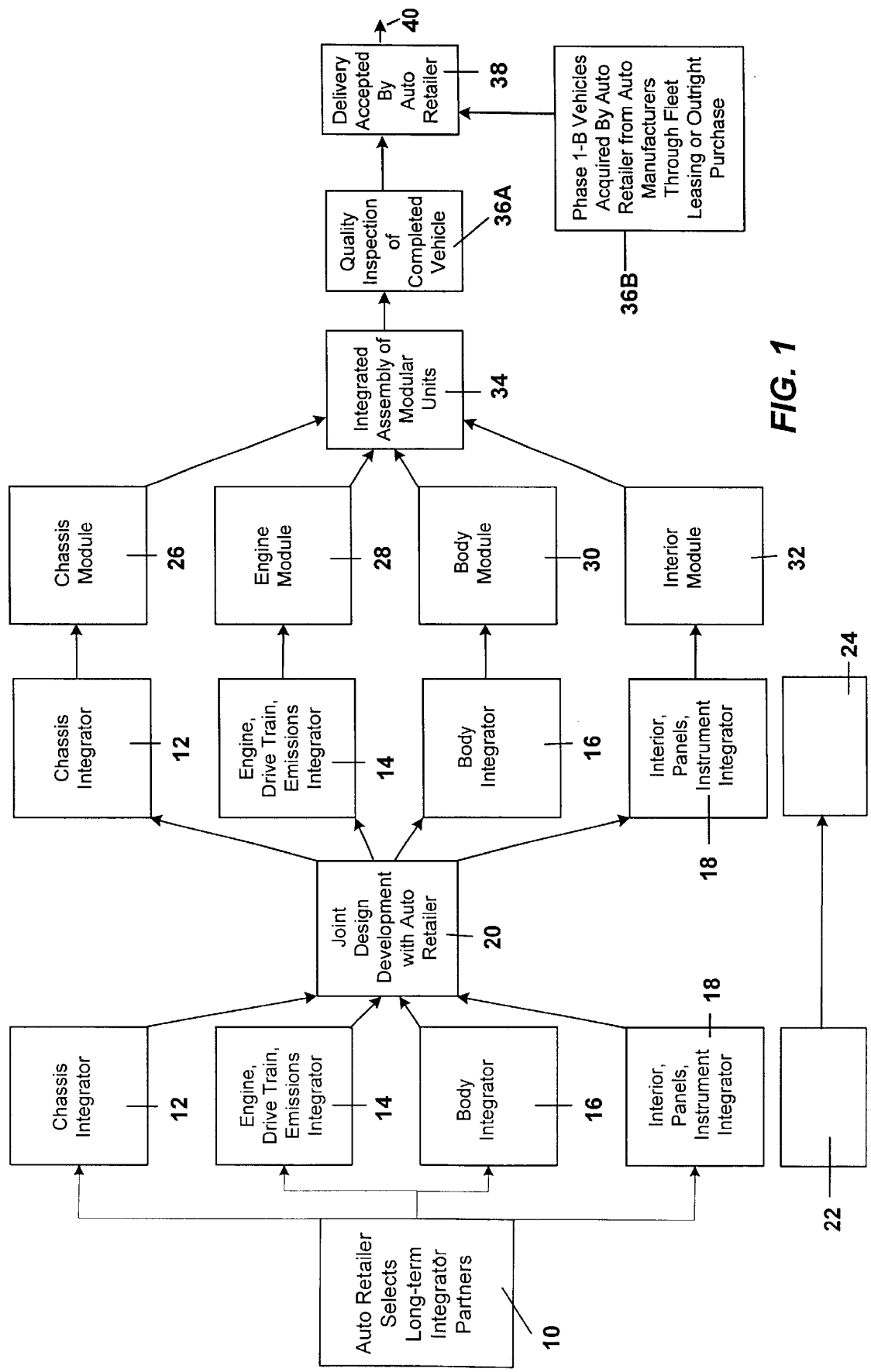
FIG. 1 is a block diagram representation of the initial steps in the process of this invention.

An optional integrator, shown at 22 is a financial integrator that would provide funds for the process and financial expertise during the manufacture and use phases of the process, possibly including vehicle insurances. At the conclusion of the joint design and development shown at 20, the integrators 12, 14, 16 and 18 manufacture the particular modules that have been assigned to them. The square 24 symbolizes the money provided by the financial integrator 22. The chassis integrator builds and contributes a chassis model 26, the engine module 28 is provided by the integrator 14, the integrator 16 provides a body module 30 and the interior panels and instruments integrator 18 provides the interior module 32.

The square 34 symbolizes the integrated assembly of modular units which subsequently are subject to quality inspection as shown at 36A and final delivery by the integrators and acceptance by the auto retailer at 38.

In a variation of this process, identified as Phase 1-B at 36B in the drawings, the auto retailer may acquire other vehicles not assembled as set forth herein, which could be made available to AutoCard 2000 customers along with AutoCard 2000-produced vehicles. In either case, the process from squares 38–92 would be the same for both categories of vehicles.

At this point in the process, the completed vehicle accepted by the auto retailer is then provided with an AutoCard 2000 card reader as shown at the square 42. The AutoCard 2000 is a credit card that, similar to a bank automated teller machine card, can be inserted in a card reader and used to start and drive only a specific car, or cars in one or more other identified groups. Cars from the retailer having AutoCard 2000 readers installed therein are then taken to a retail center 44 and, as is shown at 46, the AutoCard 2000 could be a regular card which would fit only one vehicle or class of vehicles, it could be a gold card which would operate a certain different group of automobiles or a platinum card which could be used with an even larger group of vehicles. The customer applies for and receives the AutoCard 2000 and obtains insurance from the finance-insurance integrator as shown at 48.

Figure 2:
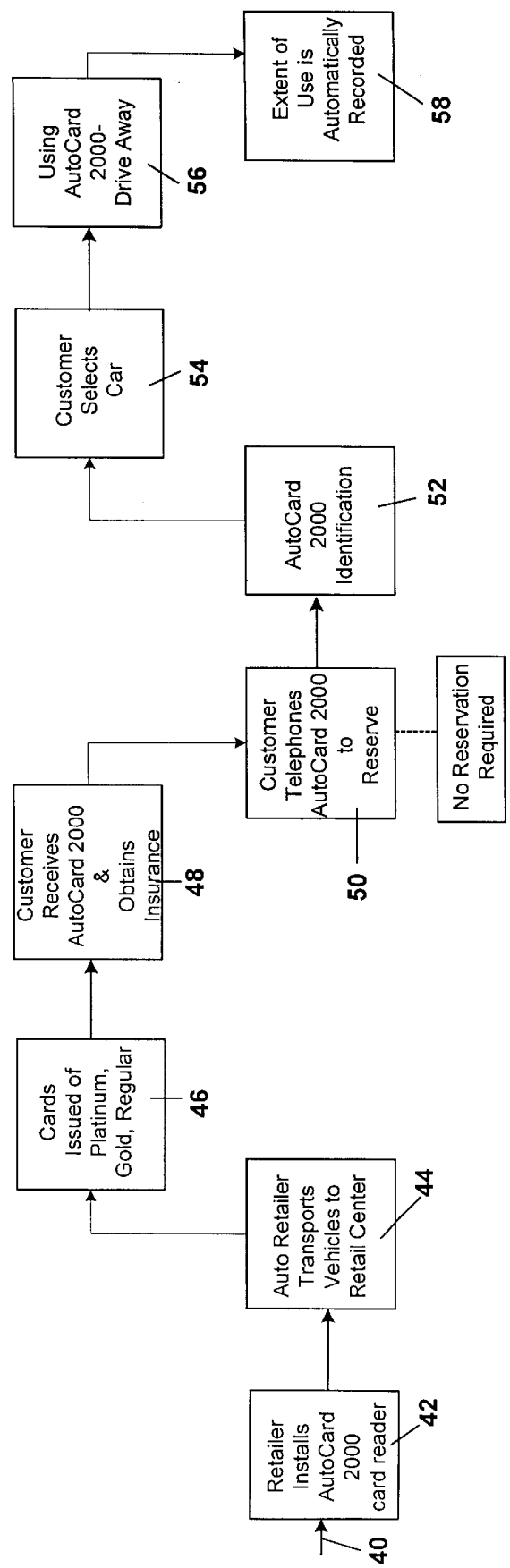
FIG. 2 is a block diagram representation of the ensuing steps in the process of this invention wherein the "customers for life" target is achieved.

As shown at 50 in FIG. 2, a customer with an AutoCard 2000 can call ahead to his destination and reserve a car that could be operated with his card. Alternatively, no reservation would be required as shown in FIG. 2. The AutoCard 2000 would then be the customer's identification as shown at 52 so he can select a car at 54 and, using his AutoCard 2000 drive away as shown at 56 and the extent of his use will be automatically recorded as shown at 58. A more detailed description follows:

How it Would Work
- Encrypted AutoCard 2000 Visa photo identification (security protected by thumbprint on magnetic strip and verified by card readers in each vehicle) would be issued by the finance-insurance integrator. There also would be an encoded PIN.
- AutoCard 2000 identification would allow members to be admitted to AutoCard 2000 lots (the purpose for photo and thumbprint readers). They could select any vehicle present within their class, insert their AutoCard 2000 in dashboard security reader, confirm thumbprint, and operate the vehicle.
- They would use the vehicle for as long or short a period (not less than one full day). GPS communication device would inform them when service is necessary and direct them to an AutoCard 2000 maintenance facility.
- When driver desires to return vehicle, GPS device would direct them to the nearest AutoCard 2000 lot. They could simply show up during normal business hours—roughly similar to those of rental car companies—or could call ahead to reserve a specific vehicle (such as a convertible in summer, four-wheel-drive in winter, sports car, minivan for moving, etc.), changing vehicles whenever desired.
- AutoCard 2000 lot vehicle stocks would include Auto-Card 2000 owned units (built and owned as described above) as well as those manufactured-purchased in traditional fleet leasing terms to fill out choice options and insure a full line of cutting-edge vehicles. (This would be an ideal market-entry strategy for brands, which are not active in the U.S. market, or for new startup brands. Such make-buy-lease decisions would be optimized by AutoCard 2000 management based on usage histories and projections.

AutoCard 2000 vehicle users would pay an average of $700 for a full month's vehicle usage, including AutoCard 2000 units utilized while traveling (rather than traditional rental cars). The usage price would be all inclusive, including maintenance and insurance, although actual rates would vary by vehicle, its age and mileage, the driver's history and insurance rating, the number of days vehicles are actually in the driver's possession, and the mix of vehicles used, including AutoCard 2000 vehicles used while traveling. Exact monthly charges would appear on the driver's AutoCard 2000 Visa statement, issued by the finance-insurance integrator.

AutoCard 2000 members also would benefit from Visa usage points. This could become a person's all-purpose transportation and travel charge card (although financial projections for finance integrator do not include float-profit on Visa usage beyond the AutoCard 2000 vehicle). Usage points could be cumulated and donated to an AutoCard 2000 nonprofit community partner—a donation AutoCard 2000 would match—which the agency could use to purchase supplies, equipment, travel, training, vehicle use, etc.

AutoCard 2000 allows every customer to have the same full choice in autos as do top auto executives using the "Executive Garage".

Barriers to defection would be very high, insuring greater customer loyalty. This would lead to significant savings in current spending on promotions, rebates, incentives and advertising, which average $2,800 per vehicle sold.

AutoCard 2000's high customer connection and GPS tracking-usage measurement system supplemented by periodic feedback opportunities from customers would provide excellent data collection to inform a manufacturer's product development plans, production schedules and volume estimates.

AutoCard 2000 would experience income tax advantages by depreciating vehicle assets on an accelerated basis, while receiving income on a straight-line basis over the vehicle's usage life.

Figure 3:
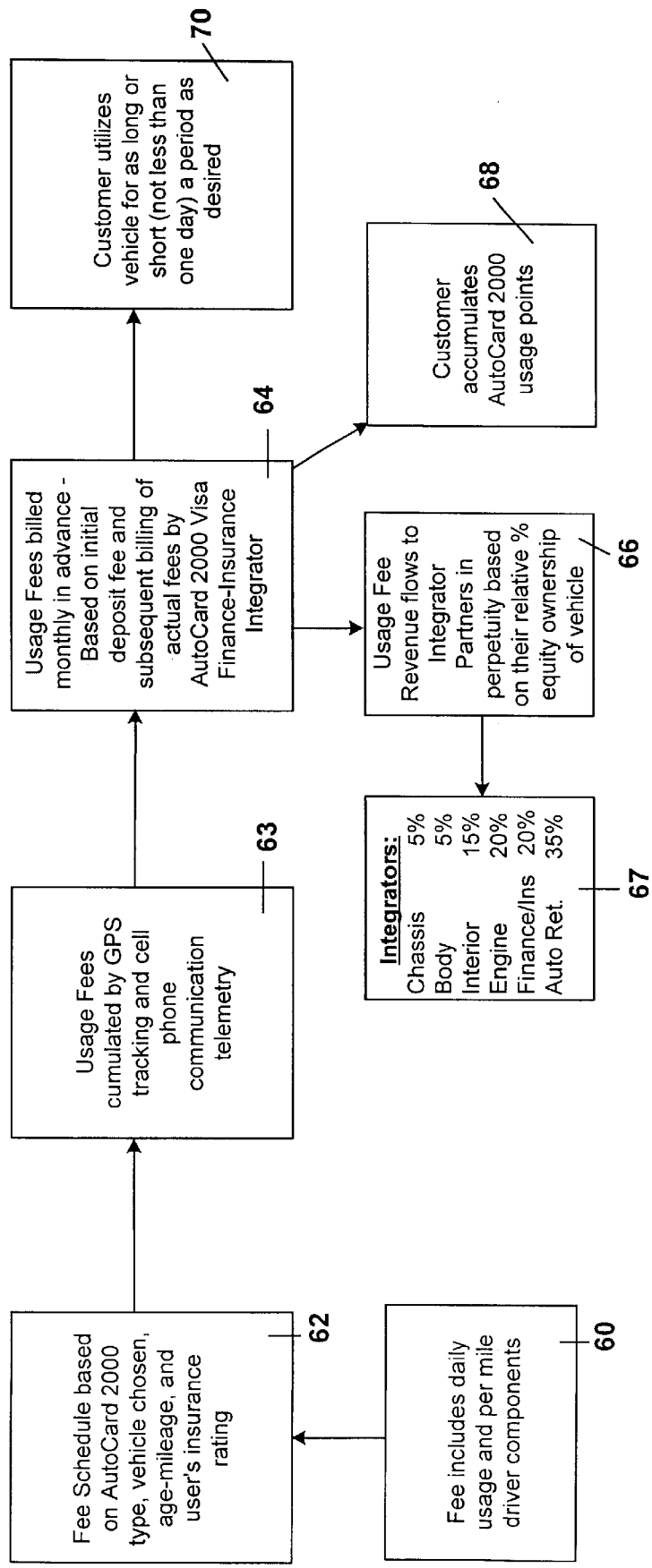
FIGS. 3 and 4 are block diagram representations of the process of this invention following the "customers for life" portion of the process to the final step where the vehicle assembled in FIG. 1 is returned to the retailer for recycling.

The matter of paying by the customer to the auto retailer 10 or the financial integrator 22 is outlined in FIG. 3. As shown at 60, the fee includes daily usage and the number of miles driven. The fee schedule is based on the AutoCard 2000 type, the vehicle chosen, the age and mileage of the vehicle and the user's insurance rating as shown at 62. At 63, it is shown that the usage fee can be monitored by G.P.S. tracking and cell phone communication telemetry.

Usage fees are billed monthly in advance based on an initial deposit fee and subsequent billing of actual fees by the AutoCard 2000 Visa finance-insurance integrator as shown at 64. At 66, it is shown that the usage fee revenue flows through the integrator partners in perpetuity based on their relative percentage equity ownership of the vehicle as shown in square, 66. At 67, the relative percentages are listed as an example. As shown in 68, the customer can accumulate AutoCard 2000 usage points and as shown at 70, the customer utilizes the vehicle for as long or short a period (not less than one day) as desired.

Figure 4:
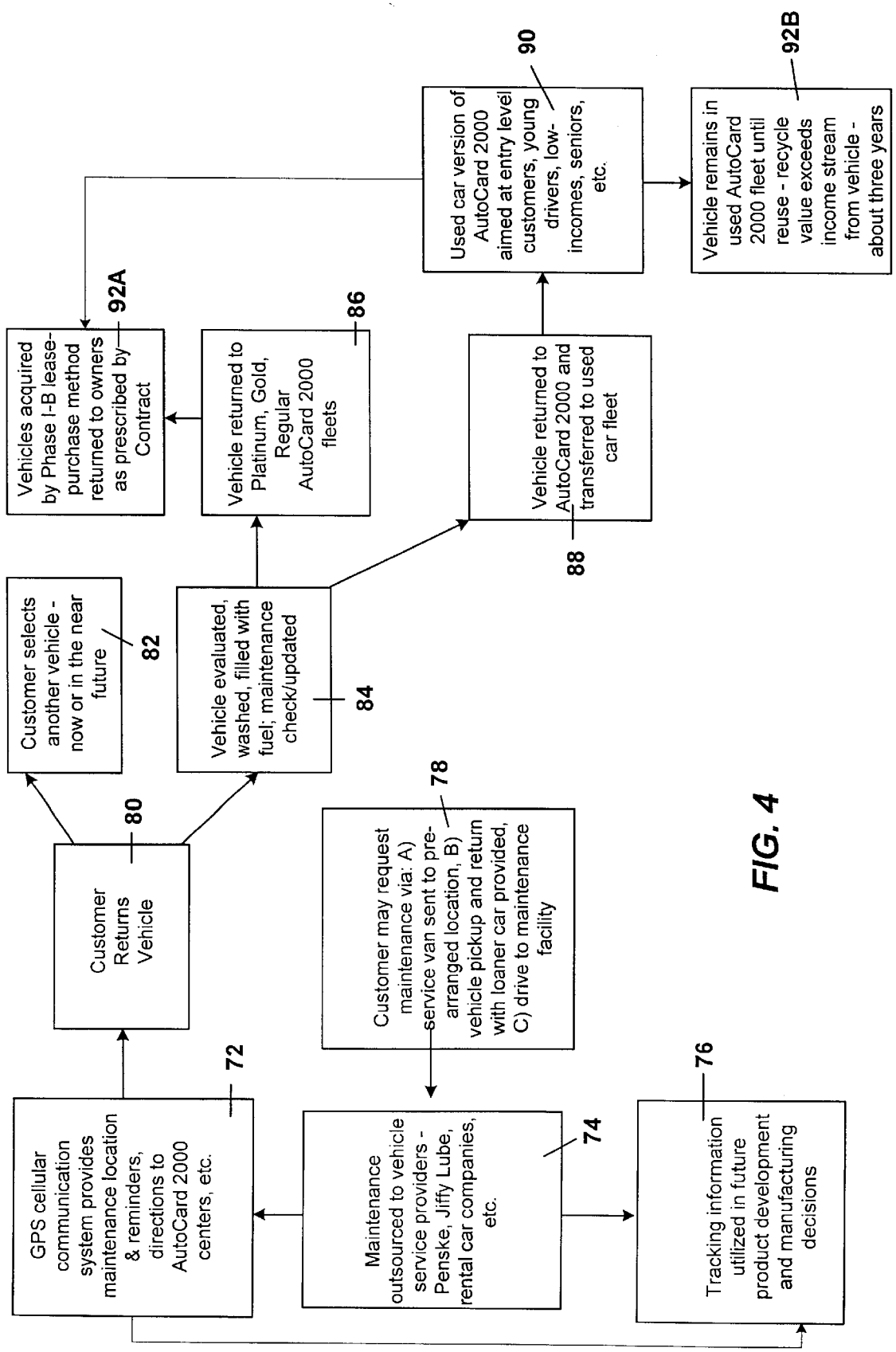

In FIG. 4, the services that can be provided in the way of tracking the car, maintenance, and utilization of tracking information for future product development and manufacturing decisions are shown at 72, 74, 76 and 78. At 80, the customer returns the vehicle. The customer then makes a choice as to whether to select another vehicle as shown at 82 or maintain use of the original vehicle as indicated at 84.

Subsequently, the vehicle can be returned to platinum, gold or regular AutoCard 2000 fleets of vehicles as shown at 86 or the vehicle can be transferred to a used car fleet as shown at 88.

The used car version of AutoCard 2000 is aimed at entry level customers such as young drivers, low income drivers, or seniors, as shown at 90. Those cars acquired via Phase 1-B can be returned to owners as prescribed by contract as shown at 92A. AutoCard 2000-manufactured vehicles would remain in the used car card fleet until reuse or recycle value exceeds the income stream from vehicle usage—in about three years—as shown at 92B. At that time, the modules are returned to the integrators for reuse and recycling.

In light of the above, it is expected that customers will be motivated to stay with the auto retailer for life. The rationale for this outcome and the market conditions driving it are set forth as follows:

Situation Analysis

The global automotive industry is most competitive in North America, where the cultural acceptance of foreign imports and virtual free-market access combine to attract more than 40 brand nameplates to the marketplace.

One inevitable result of such massive competition is a blurring of distinction among vehicles—and, when such differentiation is achieved, a shortened period of exclusivity before it is matched or exceeded. This factor is exacerbated by the design limitations imposed by safety, emissions, fuel and competitive cost standards. The result is a perception among many consumers in established segments that vehicles are so similar across competing brands that they amount to little more than commodities. And, while such vehicles undoubtedly possess subtle—sometimes elegant—distinctions, this is only of value if the consumer will pay for it.

The consumer perception of any product as a commodity presents the prospect of massive consumer disloyalty and ultimately defection over price-value issues, unless non-product aspects of the relationship can create a bond strong enough to differentiate the brand. That such an exception has not been the norm in the North American auto industry is clear from purchase-to-purchase brand loyalty, which hovers around only 25 percent.

Such massive consumer defection leads to increasing costs for advertising, promotions, incentives and rebates as manufacturers compete for their principal buyer population (about 75 percent) in a vicious open market. The average cost to attract a new customer in the U.S. auto industry averages $2,800 and—worse—three-quarters of them also defect.

Consumer churn of this magnitude leads to a decline in and ultimately the loss of profits, especially around core products and in core businesses. This is true in the North American car industry in the late-1990s, where fewer than 10 car models are profitable. And this same condition is approaching in the truck and all-purpose vehicle segments as increasing competition drives them toward commoditization, also.

As the cost of combating customer churn grows past $2,800, the total cost of new vehicle marketing surpasses $5,000 per vehicle. Economic leakage in the cascading profit margins of an arcane value chain from suppliers to component integrators to assemblers to retailers to end-user customers produces another $500–$1,200 in lost value. How and where in the value chain this $5,500–$6,200 is distributed for any particular vehicle among supplier, manufacturer, dealer, or end-user determines who wins and "profits" and who does not.

One anticipated residual effect of the global consolidations among automakers now in process and forecast for the near future, is a reduction in competition and a resultant reduction in customer turnover. If true, this could help rectify the problem and lead to improved customer loyalty, similar to what consolidating among commercial airline competitors accomplished in the 1990s. This, however, assumes a one-dimensional contributor to customer turnover—namely, the number of competitors in the distribution system.

An alternative theory suggests a two-dimensional determinant of consumer defection—(1) the number of competitors in the distribution system and (2) the dramatic differentiation that a competitor can achieve by building emotional bonds to the customer. This theory would appear to more appropriately describe the competitive challenge in the automotive industry, since even with the anticipated consolidations, enough brands will remain to maintain 8–10 brand competitors within each market segment, thus continuing the perceived commoditization of vehicle products, and requiring something more—such as a new and different consumer experience—to enhance customer loyalty.

For such customer loyalty to be created, a therapeutic approach to treating the condition of "consumer depression" must be included. This psychological condition develops when customers experience recurring episodes that are negatively perceived and seen as similar to victimization, causing more negative expectations and attributions to follow. Many consumers have found this to be the norm in their automotive experience. In the classic automotive transaction, this depressional experience is especially powerful in transaction segments involving money—price negotiation, resale value, the non-warranty cost of maintenance, etc.—and any approach to treating consumer depression to build customer loyalty should produce a barrage of pleasant, counter-intuitive customer experiences involving money and value. With customers healthier psychologically, they are then potentially able to commit to long-term relationships with a company that serves them in extraordinary ways.

Among the "customer dream" elements that could provide such perceived distinction are (1) a professional and friendly process for gathering factual competitive vehicle information, including the test driving of competitive models, (2) that provides fairly priced, no-negotiation, no-hassle vehicle selection, acquisition and usage, (3) that also allows customers to exchange vehicles from time to time at their discretion, choosing and reserving from a large selection of vehicle models, with easy return and exchange, (4) with all such vehicles being fully equipped, including cellular telephones and other electronics, (5) offering availability at numerous locations, not only where customers live but also where they travel and vacation, (6) with integrated all-in-one record keeping and billing, including all maintenance and vehicle insurance, (7) so the customer experiences a total transportation package.

"Treating" and correcting of abuse in an automobile acquisition and ownership is essential to forming a new and improved relationship. A fundamentally new economic scheme around vehicle usage such as is presented in the invention herein is one way to accomplish this. Building on this with a variety of residual customer supports would produce high barriers to defection.

While reducing product development costs (now about $1,000 per vehicle sold) and manufacturing labor costs (now about $1,200 per unit) are important issues that will improve efficiency, they currently receive disproportionately large amounts of executive attention, even though most potential savings already have been achieved given current development-production methods.

Far more stands to be gained by focusing on the rising cost of attracting new or replacement customers (averaging $2,800 per vehicle) and the small and stable number (about 25 percent) of non-hostage customers actually retained.

This system would remove from the cost-value chain retail dealer margins (about $2,700 gross) and much of the embedded costs for rebates, promotion, incentives and advertising ($2,800) and would allocate proportionately the current manufacturer cost of capital employed per vehicle (about $1,800), reducing it by about 75 percent to $450. It would also assign to suppliers the labor costs of manufacturing (about $1,200 per vehicle) and reduce overall content costs (about $11,200) by about 20 percent in total—16 percent ($1,800) through component reuse and recycling by suppliers and 4 percent ($500) by the elimination of cascading profit margins.

This would provide more than a 40 percent cost reduction in the value chain, saving over $9,000 ($9,150) per vehicle, which could be shared in increased profit margins and retail price reductions—even AutoCard 2000 holder dividends. This is essential because of today's cost of vehicle acquisition requires a greater portion of consumer disposable income (average household income minus all taxes) than at any time in this century.

This also would create new partnering relationships with integrators, which is essential to overcome the mistrust and manipulation present in current relationships—built upon manufacturer demands for continual price reductions, supplier justifications for cost maintenance, disguised or hidden supplier margins, and the resulting development of certain mistrust. This would rise above current limits to forge a true long-term partnership among auto retailers and these component module integrators. Companies currently spending billions of dollars in marketing and bidding costs at every level in the automotive supply chain to win such business would, instead, become long-term partners who could employ such resources in better value-adding ways within the customer value chain—quality enhancement, cost reduction, component life improvement, and environmental renewal.

Greater portions of vehicles would be salvaged for reuse and recycling, which would be optimized at the integrator level because such savings would enhance their total profits. This not only enhances current revenue streams, but also contributes to environmental betterment.

If integrators require capital to support their holdings, it would be sourced at commercial paper rates by Auto-Card 2000's finance-insurance integrator, with payments and debt service deducted from the revenue stream to the borrowing integrator. This would provide a "bridge" financing during early vehicle life months, when modular component values and the resultant costs of capital exceed the revenue recovery stream from usage.

Integrators also would be financially responsible for their respective percentage share of product development costs.

From the above description, it is seen that this invention provides a system enabling an automobile consortium to assemble and/or distribute automotive vehicles utilizing a plurality of partner integrators and a plurality of manufactured modules and/or distribution services, wherein each of the integrators is assigned an ownership percentage in each of the assembled and/or distributed automotive vehicles with each of said integrators contributing to said automotive consortium at least one specific assembled module such as an automotive vehicle chassis, an automotive vehicle body, an automotive vehicle interior, and/or an automotive vehicle engine, so that the automotive consortium can combine the modules to assemble a complete and finished vehicle, and/or contribute to said automotive consortium at least one specific service distribution module such as vehicle delivery to the end-user customer, finance-insurance services, etc. Collections are taken from end-user customers and allocated among automotive consortium members for associated usage fees, maintaining said vehicles, and/or insuring said vehicles. The vehicles are at least partially owned in perpetuity by the integrators in proportion to the ownership percentages with associated usage fee revenue rights, and at the termination of each vehicle's lifetime, providing for the return of all manufactured modules to their respective owner integrators for reuse or recycling.

While the above description constitutes the preferred embodiments of the present invention, it will be appreciated that the invention is susceptible to modification, variation and change without departing from the proper scope and fair meaning of the accompanying claims.

I claim:

1. A method of enabling a consortium to distribute automotive vehicles, the method comprising the steps of:
   receiving a manufactured module from each of a plurality of members of the consortium;
   combining the manufactured modules to complete a driveable automobile;
   assigning a positive ownership interest percentage in the driveable automotive to each of the plurality of members of the consortium, such that the positive ownership interest percentage of each specific member is proportional to a value of the manufactured module contributed by each specific member;
   establishing an equity cash flow by collecting an usage fee from at least one end user of the driveable automobile; and
   distributing at least a portion of the equity cash flow to each of the plurality of members in proportion to their positive ownership interest percentage.

2. The method of claim 1, further comprising the steps of:
   disassembling the manufactured modules; and
   returning each of the manufactured modules to a contributing one of the plurality of members of the consortium.

3. The method of claim 2, further comprising the step of recycling at least one of the manufactured modules.

4. The method of claim 1, wherein the step of establishing an equity cash flow includes the step of authorizing a fee based use of the driveable automobile by the at least one end user.

5. The method of claim 4, further comprising the steps of:
   installing a card reader on the driveable automobile;
   issuing a special access credit card to the at least one end user; and
   inserting the special access credit card into the card reader to gain operating access to the driveable automobile.

6. The method of claim 5, further comprising the steps of:
   automatically determining an extent of use of the driveable automobile; and
   charging the credit card issued to the at least one end user for the extent of use.

7. The method of claim 3, further comprising the step of remanufacturing and reusing the at least one of the manufactured modules.

* * * * *